United States Patent
Liu et al.

(10) Patent No.: US 6,349,257 B1
(45) Date of Patent: Feb. 19, 2002

(54) SYSTEM FOR PERSONALIZED MOBILE NAVIGATION INFORMATION

(75) Inventors: Te-Kai Liu, Elmsford; Paul A. Moskowitz, Yorktown Heights; Michael C. Greenwood, Holmes; Lawrence I. Lieberman; David A. Wood, both of Scarsdale, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,205

(22) Filed: Sep. 15, 1999

(51) Int. Cl.[7] .............................................. G06F 165/00
(52) U.S. Cl. ...................... 701/200; 701/24; 701/117; 340/5.6; 73/178 R
(58) Field of Search ........................ 701/200, 24, 117, 701/118, 119, 208, 211; 73/178 R; 340/5.6

(56) References Cited

U.S. PATENT DOCUMENTS

| 4,817,043 A | 3/1989 | Brown |
| 4,954,958 A | 9/1990 | Savage et al. |
| 4,992,947 A | 2/1991 | Nimura et al. |
| 5,067,081 A | 11/1991 | Person |
| 5,172,321 A | 12/1992 | Ghaem et al. |
| 5,291,399 A | 3/1994 | Chaco |
| 5,291,413 A | 3/1994 | Tamai et al. |
| 5,410,485 A | 4/1995 | Ichikawa |
| 5,459,304 A | 10/1995 | Eisenmann |
| 5,552,586 A | 9/1996 | Kalman |
| 5,559,707 A | 9/1996 | DeLorme et al. |
| 5,579,242 A | 11/1996 | Fisher |
| 5,604,676 A | * 2/1997 | Penzias ....................... 705/417 |
| 5,767,795 A | * 6/1998 | Schaphorst ................. 340/988 |
| 5,802,492 A | 9/1998 | DeLorme et al. |
| 5,808,566 A | 9/1998 | Behr et al. |
| 5,842,145 A | 11/1998 | Zimmer |
| 5,859,628 A | * 1/1999 | Ross et al. ................... 345/173 |
| 5,875,412 A | 2/1999 | Sulich et al. |
| 5,878,368 A | 3/1999 | DeGraaf |
| 5,902,349 A | 5/1999 | Endo et al. |
| 5,924,075 A | * 7/1999 | Kanemitsu ...................... 705/6 |
| 5,948,040 A | * 9/1999 | DeLorme et al. ........... 701/201 |
| 5,964,821 A | * 10/1999 | Brunts et al. ................ 701/201 |
| 6,009,355 A | * 12/1999 | Obradovich et al. ........... 701/1 |
| 6,009,403 A | * 12/1999 | Sato ............................... 705/6 |
| 6,085,976 A | * 7/2000 | Sehr ............................ 23/384 |
| 6,141,609 A | * 10/2000 | Herdeg et al. ................. 701/35 |

OTHER PUBLICATIONS

The Art of In–Vehicle Navigation; Wilsterman, Doug; Nov. 28, 1994; Abstract.*

* cited by examiner

Primary Examiner—William A. Cuchlinski, Jr.
Assistant Examiner—Olga Hernandez
(74) Attorney, Agent, or Firm—McGuireWoods, LLP; Stephen C. Kaufman (57) ABSTRACT

A mobile navigation system implemented as an embedded system in a vehicle is easy to use, does not detract the driver's attention from the road, and limits the number of choices presented to the user of the navigation system according to a predetermined set of preferences or personalized information. Choices are filtered according to a set of driver preferences, according to the vehicle's geographic position, direction of motion, and the driver's intended itinerary. The itinerary, including intermediate stops, is calculated on an external computing system. The information is downloaded from the computing system to a memory device such as, for example, a smart card. The information is then transferred from the smart card to the embedded vehicle navigation system. In one application of the invention, a kiosk located at a car rental agency may be used to create and store personalized navigation information onto a smart card which the customer then inserts into the vehicle navigation system that is installed in the rental car.

18 Claims, 11 Drawing Sheets

※ Netscape

▽ Lodging

Price Rating you prefer
Note: The price rating to based on the AAA Diamond ratings, 1 being the least expensive.

☐ 1  ☐ 2  ☐ 3  ☐ 4  ☐ 5

Lodge style you prefer

☐ Motel
☐ Hotel

Other facilities required
Note: Selecting options in this category might restrict your search results.

☐ Phone access
☐ Internet Access
☐ Television
☐ Swimming Pool
☐ Restaurant
☐ Pets Allowed

Time to reach

○ Within 5 minutes  ○ Within 15 minutes  ○ Within 25 minutes
○ Within 10 minutes  ○ Within 20 minutes

Restaurant

Breakfast

Price Rating you prefer
Note: The price rating 1 to 2 based on the AAA Diamond ratings, 1 being the least expensive.

☐ 1   ☐ 2   ☐ 3   ☐ 4   ☐ 5

Food Style you prefer

☐ American  ☐ Mexican  ☐ Indian  ☐ Vegetarian
☐ Italian      ☐ Chinese    ☐ Thai

Time to reach the restaurant

○ Within 5 minutes  ○ Within 15 minutes  ○ Within 25 minutes
○ Within 10 minutes ○ Whithin 20 minutes

Lunch

Price Rating you prefer
Note: The price rating 1 to 2 based on the AAA Diamond ratings, 1 being the least expensive.

☐ 1   ☐ 2   ☐ 3   ☐ 4   ☐ 5

Food Style you prefer

☐ American  ☐ Mexican  ☐ Indian  ☐ Vegetarian
☐ Italian      ☐ Chinese    ☐ Thai

Time to reach the restaurant

○ Within 5 minutes  ○ Within 15 minutes  ○ Within 25 minutes
○ Within 10 minutes ○ Whithin 20 minutes

Dinner

Price Rating you prefer
Note: The price rating 1 to 2 based on the AAA Diamond ratings, 1 being the least expensive.

☐ 1   ☐ 2   ☐ 3   ☐ 4   ☐ 5

Food Style you prefer

☐ American  ☐ Mexican  ☐ Indian  ☐ Vegetarian
☐ Italian      ☐ Chinese    ☐ Thai

Time to reach the restaurant

○ Within 5 minutes  ○ Within 15 minutes  ○ Within 25 minutes
○ Within 10 minutes ○ Whithin 20 minutes

Service Station

Fuel Type for your vehicle
- ⊙ Gasoline
- ○ Diesel

Other facilities required
Note: Selecting options in this category might restrict your search results.
- ☐ Car Wash
- ☐ Snacks
- ☐ Coffee

Preferred Gas Company(s)
- ☐ Arco
- ☐ Chevron
- ☐ Exxon
- ☐ Mobil
- ☐ Shell
- ☐ Texaco

Time to reach
- ○ Within 5 minutes ○ Within 15 minutes ○ Within 25 minutes
- ○ Within 10 minutes ○ Whithin 20 minutes

SYSTEM FOR PERSONALIZED MOBILE NAVIGATION INFORMATION

BACKGROUND OF THE INVENTION

1. Field of the Invention

The present invention generally relates to an embedded vehicle mobile navigation system and, more particularly, to a vehicle navigation system which limits the number of choices presented to the user and provides a convenient means of transferring personalized preferences and itinerary to the navigation system.

2. Background Description

Mobile navigation information systems contain too much information to be of efficient use to a vehicle driver. The number of possible choices presented for a specific request is too great. The cognitive load required for a driver to sort through the choices makes the sorting operation dangerous for driving. For instance, a request for hotel choices in a densely populated area may yield fifty possibilities. A graphic display of all of the choices will be confusing in a situation in which the vehicle is at rest, let alone in motion. The driver must keep his or her eyes on the road. Using text-to-speech (TTS) output for the user interface does not solve the problem. A large list of choices may be read one item after another by a TTS system, but any listing of more than a few items will soon overload the listener's capacity of recall. In addition, mobile information systems such as those installed in automobiles do not provide a quick or easy means of entering itinerary choices into the system. Requests must be entered using a graphical user interface (GUI) employing touch screen, push buttons, typing, or other cumbersome interface not well suited to driving an automobile or other vehicle.

It is necessary to limit the number of choices presented to the user of a mobile navigation system in a useful manner; i.e., according to a predetermined set of preferences or personalized information. It is necessary to define a convenient means of transferring personalized preferences and itinerary to a vehicle navigation system.

Currently, there are several mobile navigation systems available which are based on the global positioning satellite (GPS) system. Examples include General Motors Corporation's OnStar™ system, Phillips' Carin™ system, and DeLorme's Tripmate™ system.

The OnStar™ system is a call-centered based system. The driver of a vehicle contacts the call center by cellular telephone. The vehicle's GPS coordinates are automatically sent to the call center. The driver expresses his or her preferences for a route or hotel or restaurant to a call center operator who, in turn, uses the aid of a computer containing navigation information to calculate a route which is relayed to the driver. This system relies on the vagaries of the wireless cellular telephone network and the intervention of a human operator to aid the driver and to make appropriate choices.

The Carin™ system is an embedded automotive navigation system. It contains too much information to be of efficient use to a vehicle driver. The number of possible choices presented for a specific request is too great. The cognitive load required for a driver to sort through the choices makes the sorting operation dangerous for driving. For instance, a request for hotel choices in a densely populated area may yield so many choices that a graphic display of all the choices will be confusing.

The DeLorme system allows the user to calculate a route using a graphical interface on a standalone PC, such as a laptop computer. The user can input route and display preferences manually. The PC may then be placed in the vehicle and used to provide route guidance. The system is cumbersome, requiring the attachment of cables for GPS antenna and power supply. Use of the PC in a moving vehicle is difficult. The DeLorme system also provides the option of downloading route information or map information to a PDA, which may then be placed in the vehicle. Again, this variation of the system is cumbersome to use in a vehicle.

SUMMARY OF THE INVENTION

It is therefore an object of the present invention to provide a vehicle navigation system which is easy to use, does not detract the driver's attention from the road, and limits the number of choices presented to the user of the navigation system according to a predetermined set of preferences or personalized information.

It is another object of the invention to provide a convenient means of transferring personalized preferences and itinerary to a vehicle navigation system.

According to the invention, the choices are filtered according to a set of driver preferences, according to the driver's geographic position, direction of motion, and intended itinerary. The itinerary, including intermediate stops, is calculated on an external computing system, such as a standalone personal computer (PC) or network (Web or Internet) based system. The information is downloaded from the PC or Web-based application to an intermediate carrying means such as, for example, a smart card or a personal digital assistant (PDA). The information is then transferred from the smart card or the PDA to the vehicle navigation system.

One application of the invention is in rental cars equipped with a vehicle navigation system. A kiosk located at the car rental agency may be employed to feed the information into a smart card which the customer then inserts into the vehicle navigation system of rental car.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
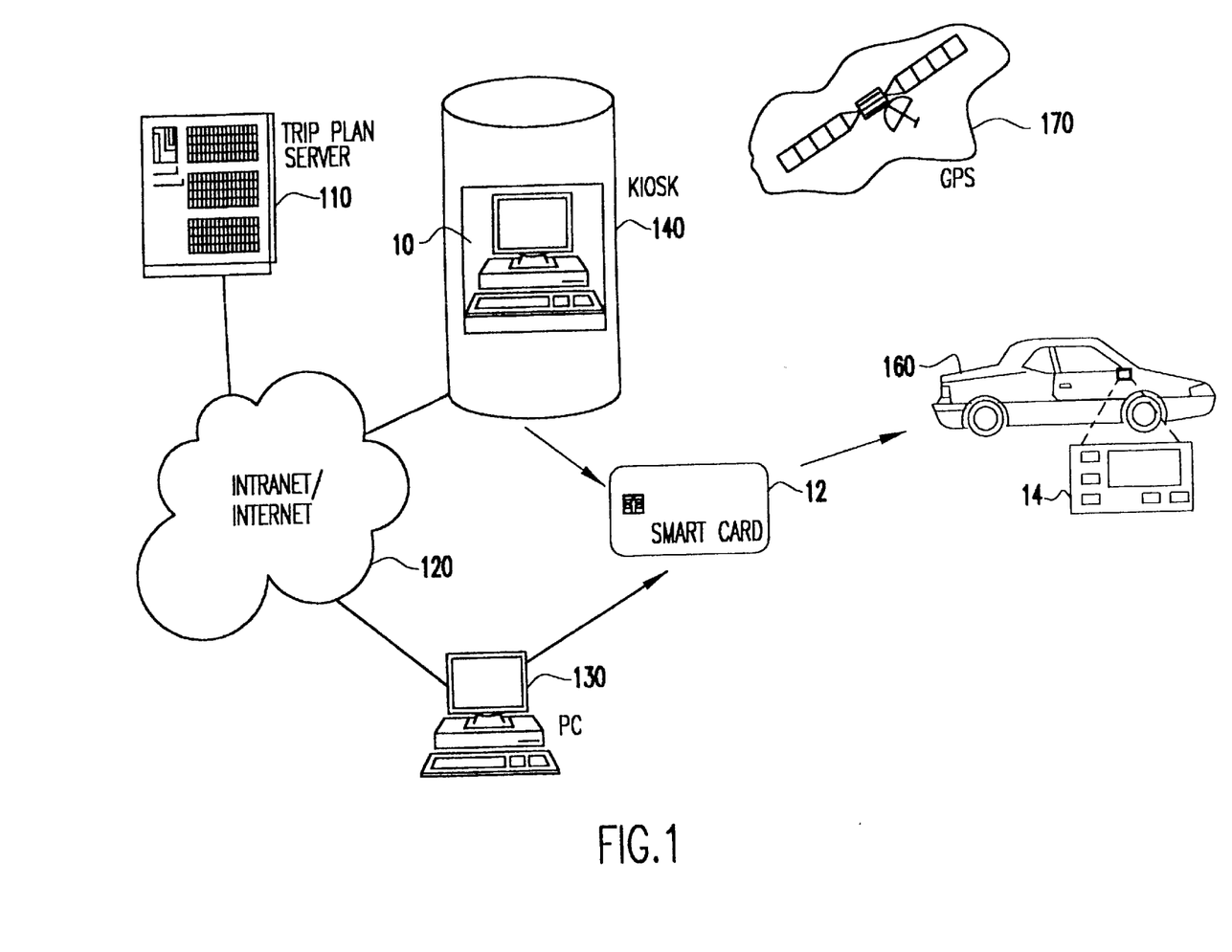
FIG. 1 is a block diagram showing the basic components of the vehicle navigation system according to the invention.

Referring now to the drawings, and more particularly to FIG. 1, there is shown a block diagram illustrating the basic components of the invention. These include a computing system 10, a transfer means 12 and a mobile navigation system 14.

The computing system 10 is used to create an itinerary and routing according to the needs of each individual traveler. The computing system 10 is also used to create and store a set of personal preferences. Examples include preferences for types of routes taken (e.g., scenic, fastest, etc.), hotel preferences (e.g., limited service, luxury, proximity to route, etc.), and restaurant preferences (fast food, family, Italian, etc.).

The computing system 10 may be located within a kiosk 140 at a car rental agency. The computing system 10 may be a simple terminal connected through a network (i.e., an intranet or the Internet) 120 to a trip plan server 110, from which the computing system 10 may access information on current route conditions (detours, congestion, etc.) so that alternative route information may be computed. The trip plan server 110 in this case performs the computing functions necessary to generate the itinerary.

Alternatively, a personal computer (PC) 130 located at the home, office or other location may be used as the computing system to create and store personal preferences. Either the computing system in the kiosk or the PC may be provided with means to download information to the transfer means 12.

Once the computing system 10 (or the PC 130) has generated the itinerary including route and preference information, this information is downloaded to a memory device which constitutes the transfer means 12. This memory device is preferably a smart card which is issued to the driver by the rental car agency. Other memory devices may be used such as, for example, a Personal Digital Assistant (PDA), a PCMCIA card, or a portable storage device such as a diskette. The manner in which the information is downloaded to the transfer means 12 by the computing system 10 is entirely conventional.

Other transfer means may be used, including, but not limited to, wireless communications via radio frequency or infrared (IR) or a cable connection from the computing system 10 in the kiosk 140 to the mobile navigation system 14 in a vehicle 160.

In the case of a smart card or PDA, the driver then carries the smart card 12 or PDA to his or her vehicle which contains an embedded mobile navigation system 14. The smart card is inserted into the reader slot or, in the case of a PDA, another connection is made to the memory device to provide the mobile navigation system 14 with the personalized route and preference information calculated by the computing system 10. The mobile navigation system 14 then makes use of the personalized information to customize the information provided to the driver of the vehicle.

The mobile navigation system 14 may be equipped with location determining hardware and software which use the GPS satellite system 170. Alternatively, location may be derived from cell phone means, e.g., triangulation, or other known differential location systems.

Figure 2:
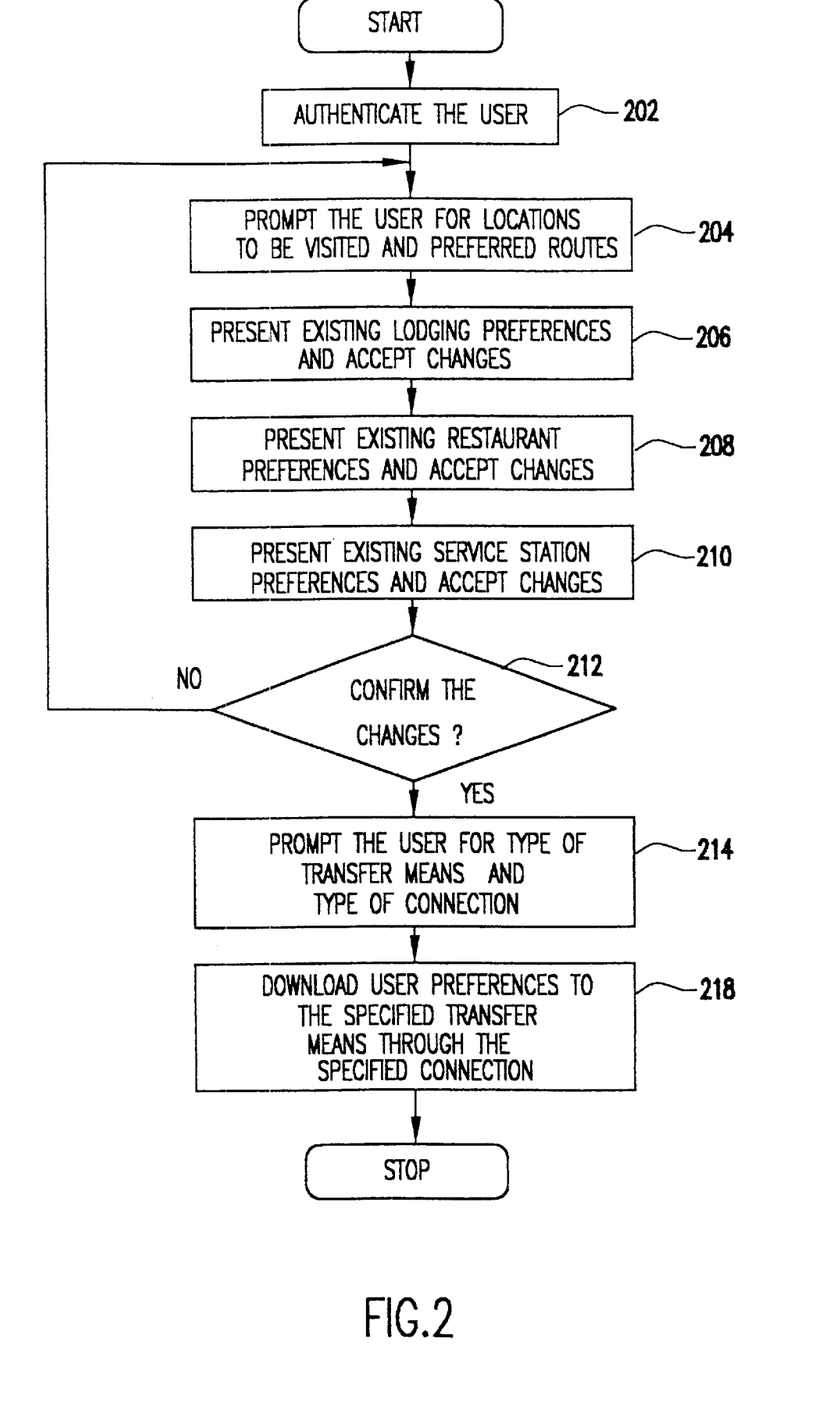
FIG. 2 is a flow diagram of the program running on the computing system of FIG. 1 for generating personalized navigation information.
Figure 3:
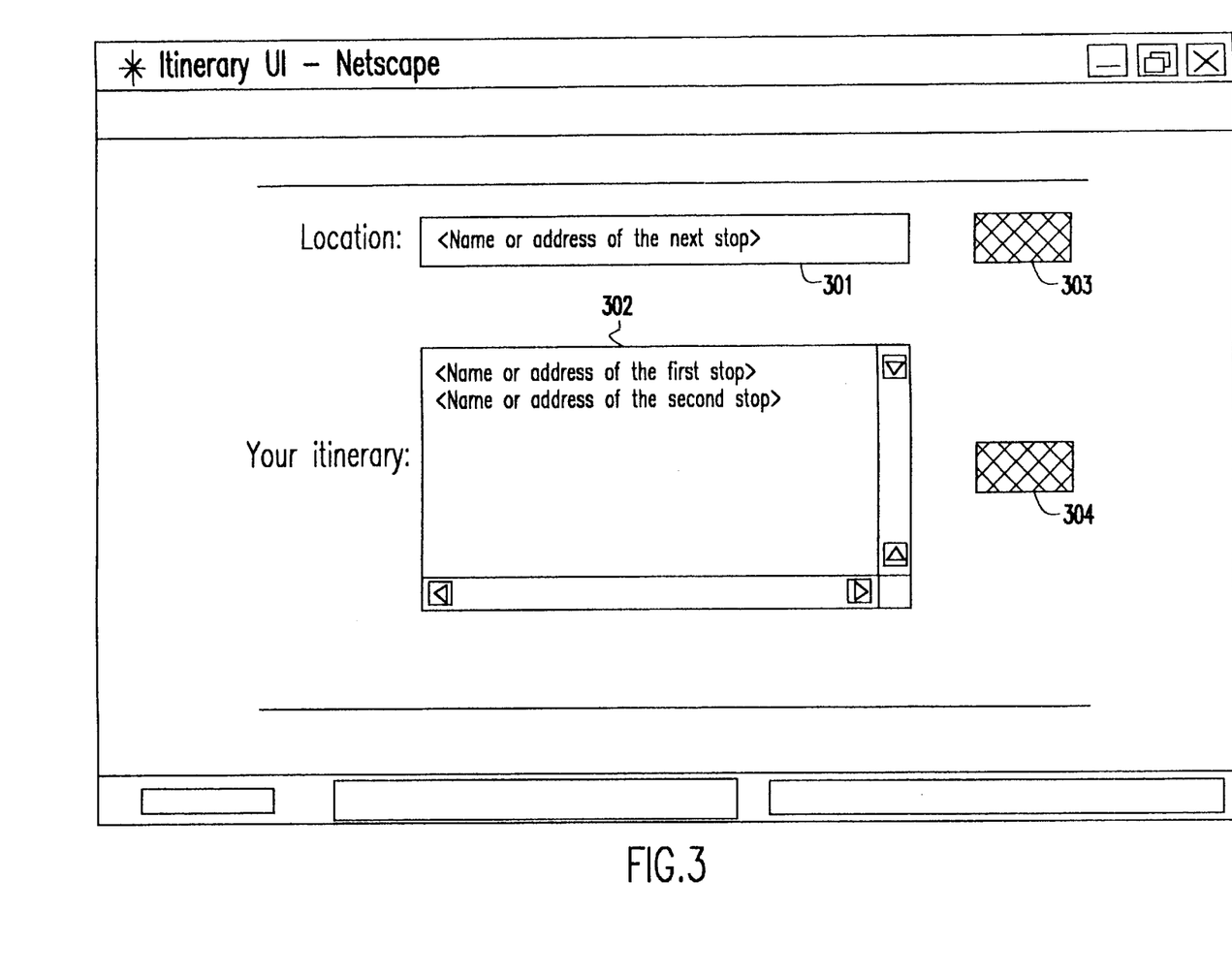
FIG. 3 is an input screen used to prompt the user for his or her itinerary.
Figure 4:
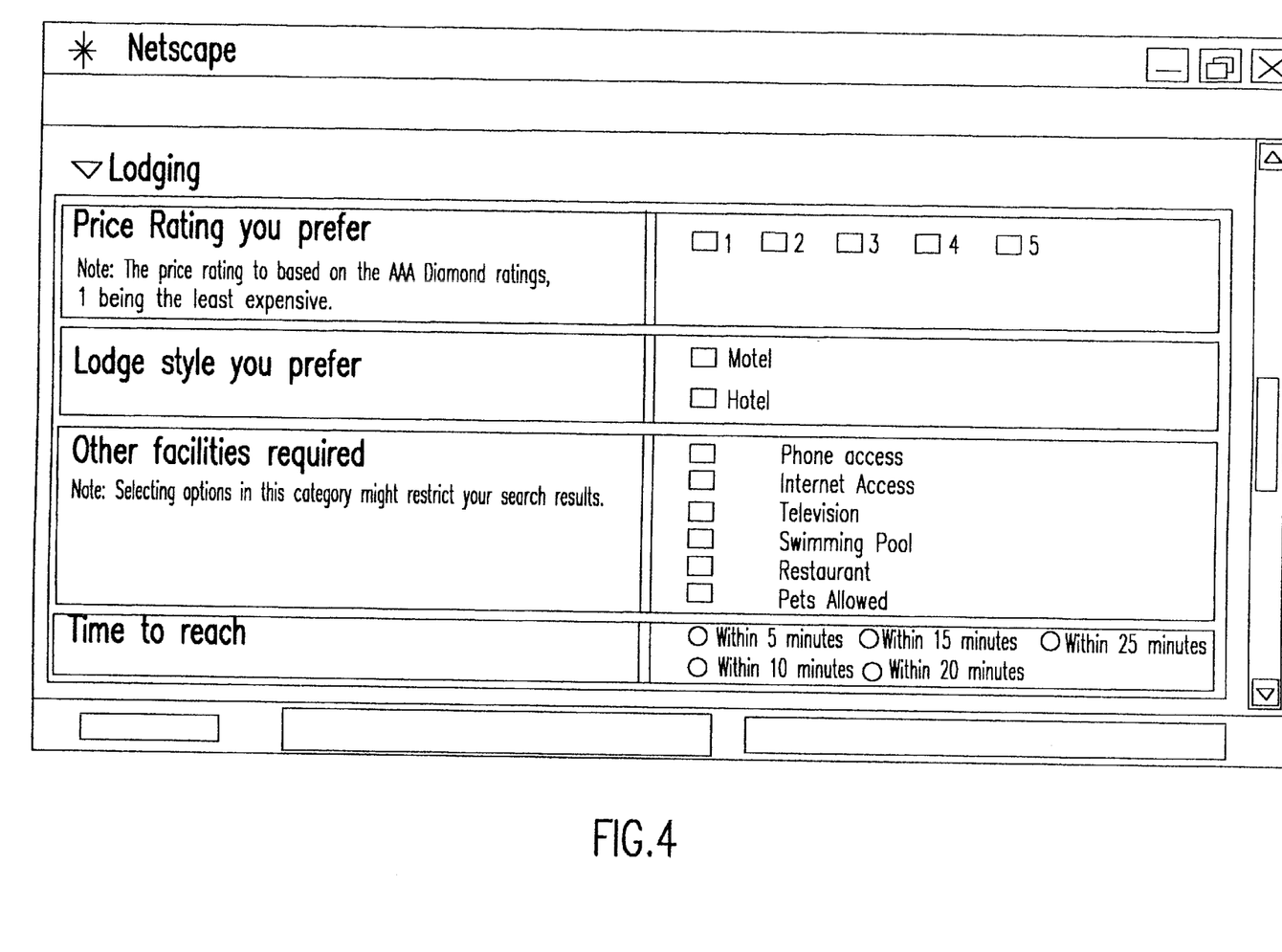
FIG. 4 is an input screen used to prompt the user for hotel preferences.
Figure 5:
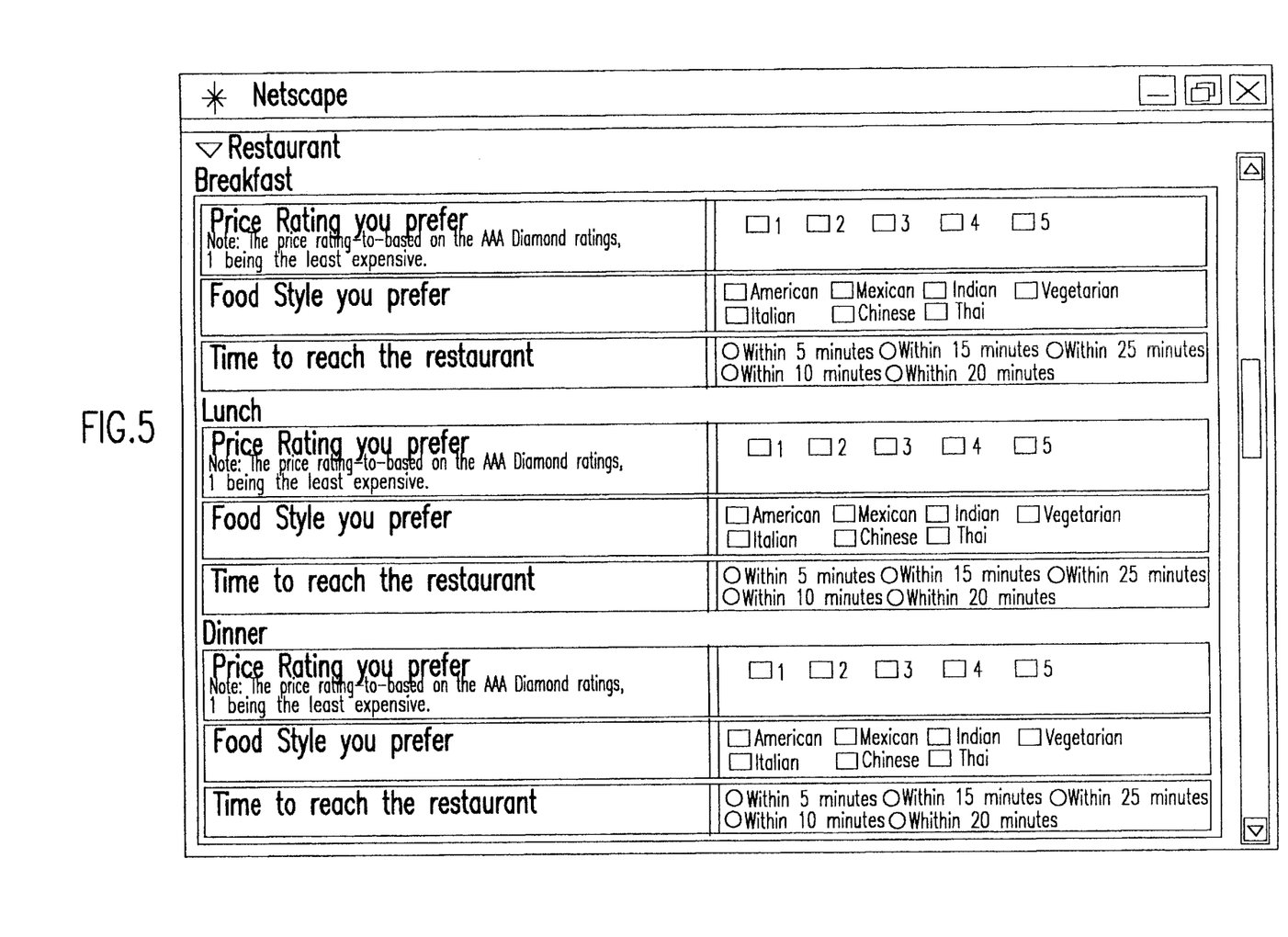
FIG. 5 is an input screen used to prompt the user for restaurant preferences.
Figure 6:
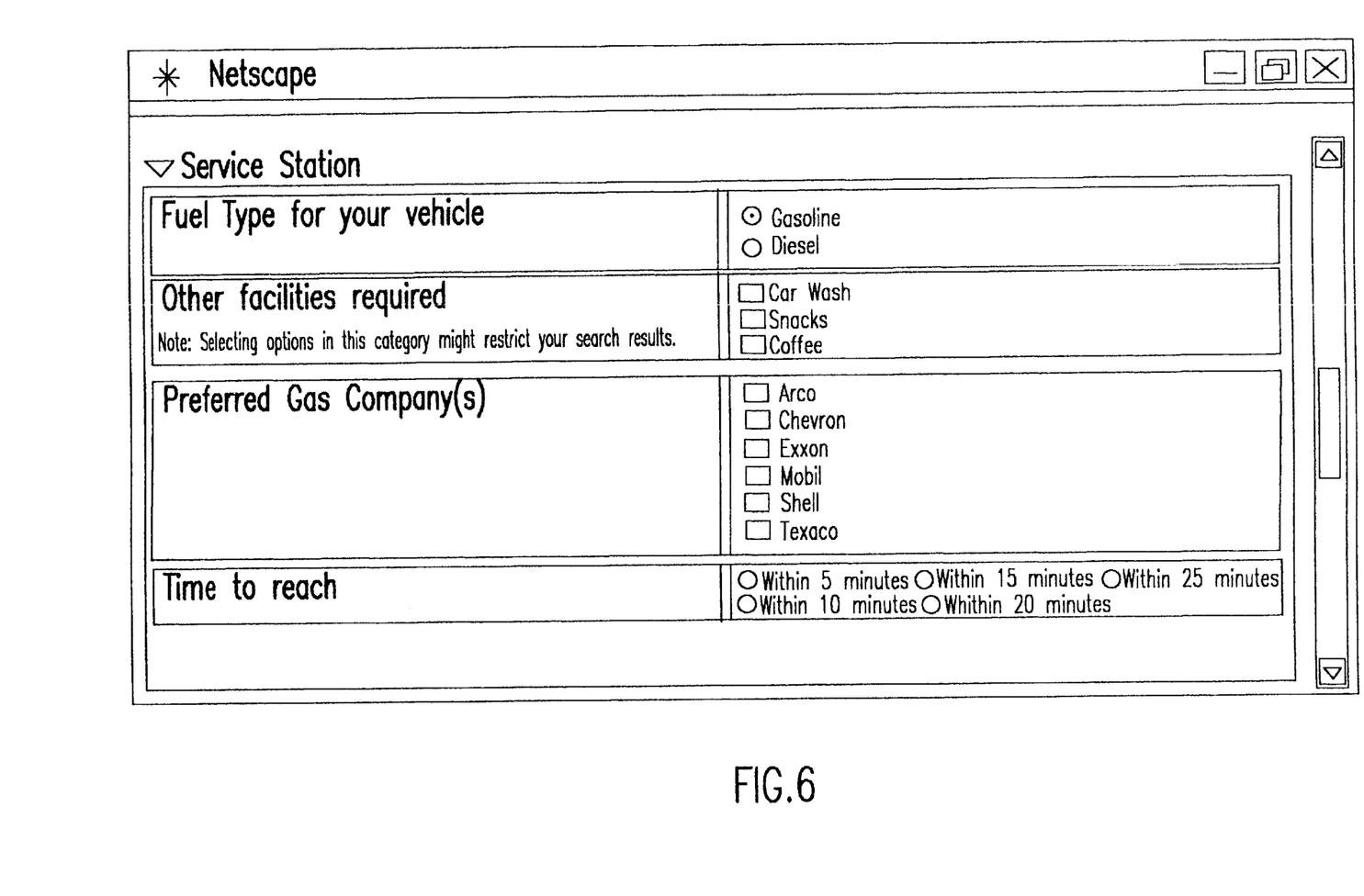
FIG. 6 is an input screen used to prompt the user for service station preferences.

FIG. 2 is a flow diagram showing the logic of the software running on the computing system 10 for generating personalized navigation information. The computing system 10 in the first step 202 presents a login screen waiting to authenticate the user. Upon the computing system successfully authenticating the user (either by user name and password or by a security token such as the smart card), the user's profile is retrieved. The computing system 10 then interacts with the user and prompts the user to input his or her itinerary in step 204. The itinerary includes a location or set of locations that the user plans to visit on a trip and a set of preferred routes. The routes can be computed for the user based on user preferences, such as most direct route, most scenic route, etc. FIG. 3 shows an input screen for the user to input his or her itinerary, which will be described in more detail later. The computing system 10 follows in steps 206, 208 and 210 to prompt the user to input preferences for lodgings, restaurants and service stations, respectively. If the user has previously used the system, the computing system may store existing preferences for that user, in which case, the prompts in steps 206, 208 and 210 allow the user to change any of the existing preferences or to simply accept them. For example, the user may prefer to stay in a hotel which is in a certain price range, located within a certain mileage limit, and which is equipped with certain amenities such as a swimming pool and/or data port. The user may also, for example, specify preferred hotel chains. FIGS. 4, 5 and 6 show input screens for the user to set his or her preferences for lodgings, restaurants and service stations, respectively. FIGS. 4 to 6 will be described in more detail later. After the user finishes inputting his or her preferences in steps 204, 206, 208 and 210, the computing systems asks the user in step 212 to confirm the input preferences. If the user does not confirm the input preferences, the user can repeat steps 204, 206, 208 and 210 until he or she is satisfied with the input preferences. If the user confirms the input preferences in step 212, the computing system 10 will prompt the user in step 214 for the type of transfer means and the type of connection from the computing system to the transfer means. Depending on the specified type of transfer means and the type of connection, the computing system 10 will activate the corresponding connection interface and download the itinerary and preferences for points of interest to the transfer means in step 218. In the car rental application, step 214 would be omitted; that is, the user would not be prompted since the transfer means (e.g., smart card) would be pre-defined.

FIG. 3 shows the screen for prompting the user to input his or her itinerary which is a location or set of locations the user plans to visit during the trip planned. There are two text areas in the center of the screen. One 301 is labeled with "location" and the other 302 is labeled with "Your itinerary". The text area 301 labeled with "Location" is for the user to type in the name or address of the locations he or she plans to visit. When the user finishes typing the name or addresses of a location, he or she presses (i.e., clicks on) the "Add" button 303 on the right to add this location to the user's itinerary 302. If the user inputs a wrong location or if the user later decides not to visit a location which is on his or her itinerary, he or she can select that location at 301 and press (i.e., click on) the "Remove" button 304 to remove that location from his or her itinerary.

FIG. 4 shows the screen for prompting the user to input lodging preferences. Input is made by checking, by means of a mouse click, various boxes in the right hand side of the screen. The choices are labeled "Price Rating you prefer", "Lodge style you prefer", "Other facilities required", and "Time to reach". Five choices based on the AAA diamond ratings are provided under the "Price Rating you prefer". Other recognized ratings may be used or, in the alternative, price ratings may be defined for this particular application. The user may check any one of these. The input may be made mandatory, meaning that the user must select one of the price ratings before the input screen is accepted by the system, or optional, meaning that the user need not make a selection and thereby can broaden the results of the data base search. It would also be possible to allow the user to select a range by allowing the user to check, say, boxes 2 and 4. Next, the user is given a choice of motel or hotel for "Lodge you prefer". This category could also be expanded to include bed-and-breakfasts, for example. Several choices are provided to the user under "Other facilities required". These include phone access, Internet access, television, swimming pool, restaurant, and pets allowed. Other and/or different facilities may also be included such as, for example, fitness center, laundry and dry cleaning service, and business office. None or multiple selections could be made; however, the more selections made would result in restricting the search results. Finally, under "Time to reach", the user is offered various time periods from which to select and which relate to the time it takes to travel to the lodging form the primary route taken for the trip.

FIG. 5 shows the screen for prompting the user to input restaurant preferences. The choices here are broken down into subcategories of "Breakfast", "Lunch" and "Dinner". Each subcategory provides the user with choices of "Price Rating you prefer", "Food Style you prefer" and "Time to reach the restaurant". The price rating in this example is again based on the AAA diamond ratings and, again, other ratings may be employed. The "Food Style you prefer" gives the user several choices based on nationality and vegetarian. The choices could also be expanded to include various fast food franchises which can be particularly important when traveling with children who are known to have very definite preferences and/or who, for example, are collecting the current give away toys.

FIG. 6 shows the screen for prompting the user to input service station preferences. There are four categories in this input screen. The first is the type of fuel required, and the choices are gasoline and diesel. This latter choice can be critical since many service stations do not carry diesel fuel. The next category, "Other facilities required", include selections like "Car Wash", "Snacks" and "Coffee". Other selections could be added, but as in all these screens, the more selections a user makes, the more restricted will be the results of the data base search. The category "Preferred Gas Company(s)" allows the user to specify which gas companies the user prefers, possibly based on which credit cards the user has. This category could be expanded to include other types of credit or debit cards, such as VISA®, American Express® and Master Card® cards.

Figure 7:
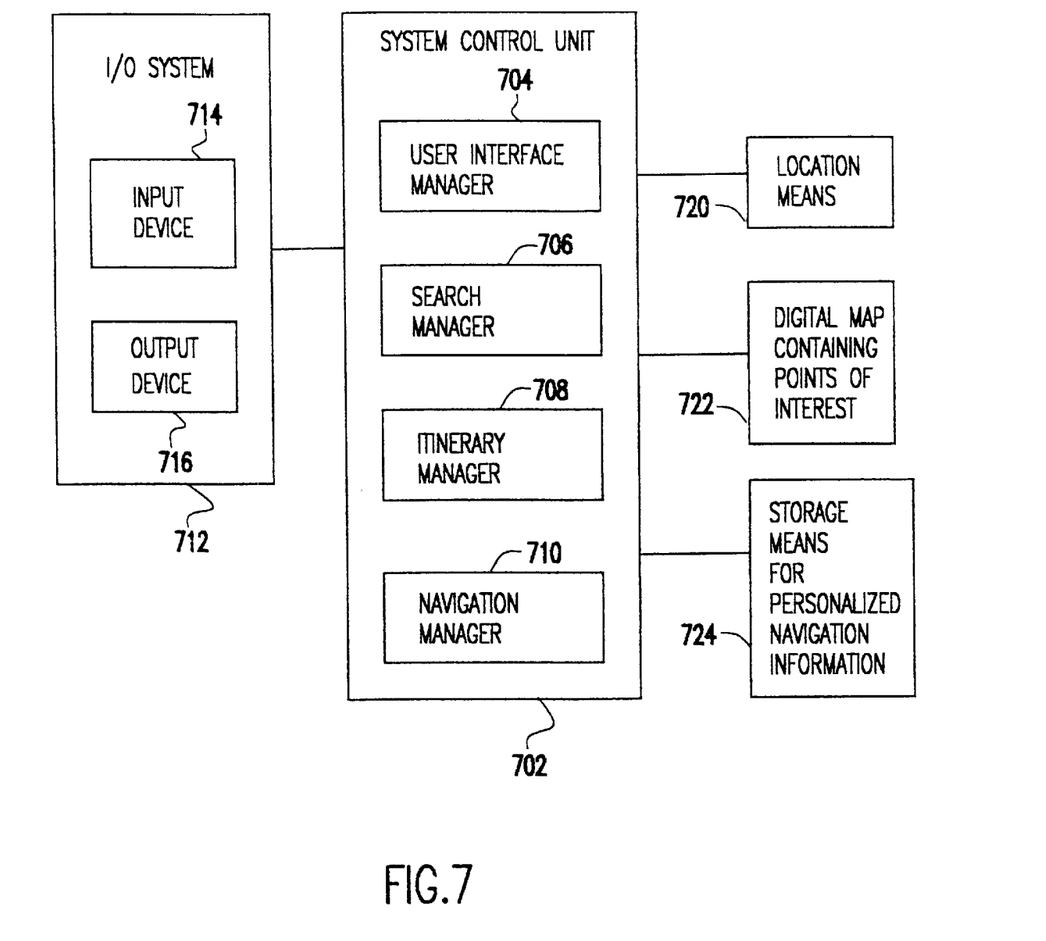
FIG. 7 is a block diagram of the mobile navigation system.

FIG. 7 is a block diagram of the mobile navigation system. The mobile navigation system includes a system control unit 702, an input/output (I/O) system 712, a location means 720, a digital map 722 containing points of interest and road maps, and storage means 724 for the personalized navigation information. The system control unit 702 is the central processing unit (CPU) which coordinates the I/O system 712, the location means 720, the digital map 722, and data stored in the storage means 724. The I/O system comprises an input device 714 and an output device 716 which are the interface between the user and the mobile navigation system. The output device can be a color display with a built-in speaker. The input device can be a touch screen, a compact keypad, buttons on the display, a speech recognition device, or any combination of the foregoing. The location means 720 can be a GPS receiver. The digital map 722 can be a CD-ROM (compact disk-read only memory) or other data storage media storing road maps with certain coverage and a database containing information about points of interest. The storage means 724 for the personalized navigation information can be an EPROM (electronically programmable read only memory), a flash memory, a disk drive, or other recordable storage device.

The system control unit 702 further executes four computer processes; the user interface manager 704, the search manager 706, the itinerary manager 708, and the navigation manager 710. The user interface manager accepts service requests from the user and presents to the user the results in response to the user's requests. The user interface manager 704 also updates the user about the status of the mobile navigation system 14 and prompts the user for imminent maneuvers when the user's attention is needed. The search manager 706 will search the points of interest contained in the digital map 722 based on the user's preferences stored in the storage means 724. The itinerary manager 708 keeps track of the location(s) the user wants to visit based on the itinerary information stored in the storage means 724. It frees the user from manually entering the destination information that the user has planned to visit. The navigation manager 710, after receiving a new destination request from the user interface manager 704, reads the current vehicle position from the location means, maps the current vehicle position to the digital road map, computes a route to the destination, and gives the user turn-by-turn instructions via the user interface manager 704 and I/O system 712.

Figure 8:
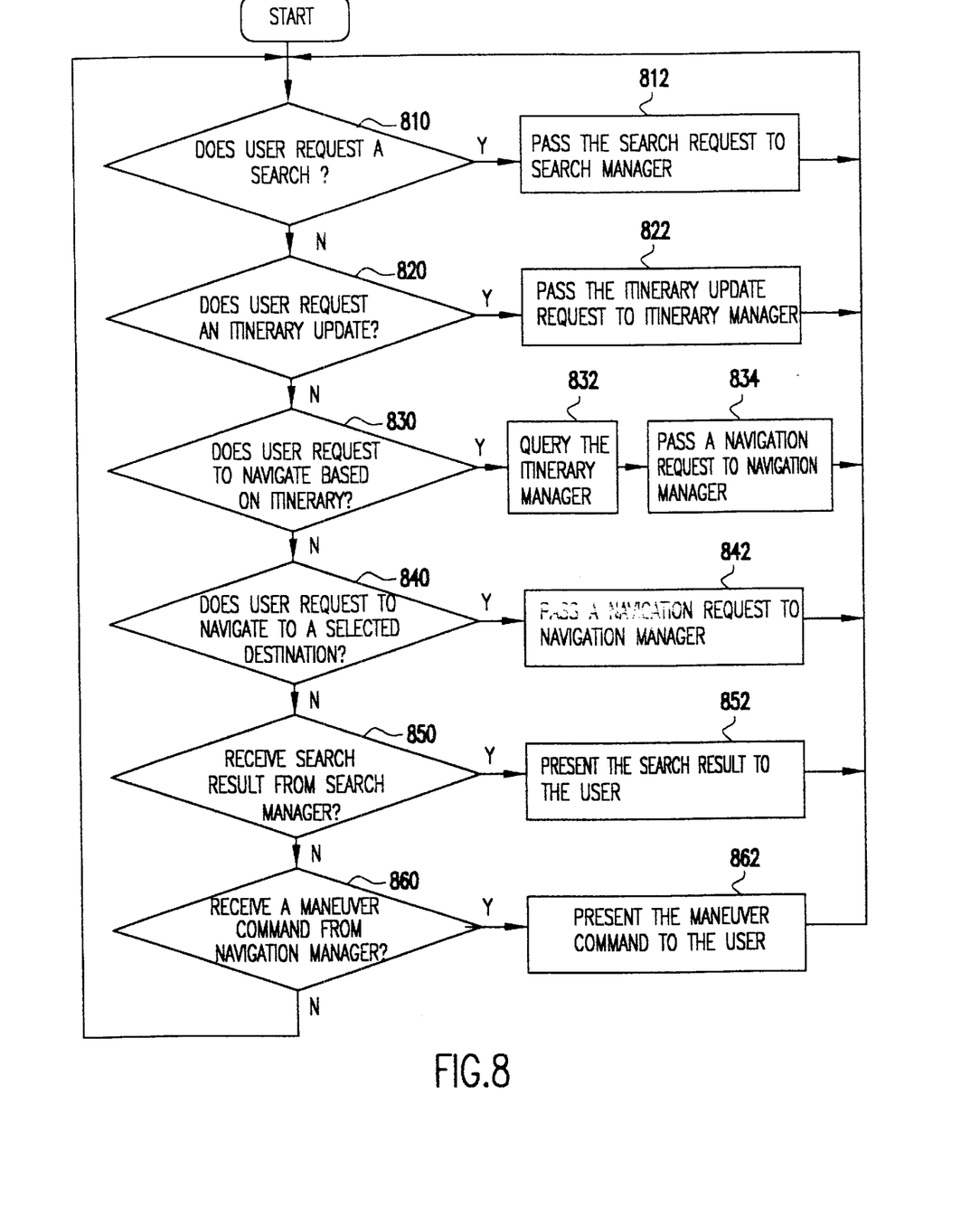
FIG. 8 is a flow diagram of the user interface manager implemented on the mobile navigation system.

FIG. 8 shows the flow diagram for the user interface manager 704. The user interface manager 704 works between the user and the other three managers; i.e., the search manager 706, the itinerary manager 708 and the navigation manager 710. The user interface manager 704 keeps checking whether there is a request made by the user or a response from the search manager 706, itinerary manager 708 and the navigation manager 710 in the loop containing steps 810, 820, 830, 840, 850, and 860. When the user interface manager 704 receives from the user a search request in step 810, it will pass on the search request to the search manager 706 in step 812. When the user interface manager 704 receives a request to update the user's itinerary in step 820, it will pass the request to the itinerary manager 708 for adding or removing a stop on his or her itinerary in step 822. When the user interface manager 704 receives a request from the user to navigate based on his or her itinerary in step 830, the user interface 704 will first query the itinerary manager 708 in step 832 for the next stop on the itinerary, and then pass to the navigation manager 710 a request to navigate to a given stop in step 834. When the user interface manager 704 receives a request from the user to navigate to a selected location in step 840, the user interface manager 704 will pass on to the navigation manager 710 a request to navigate to the selected stop in step 842. When the user interface manager 704 receives search results from the search manager 706 in step 850, it will tailor the result according to the dimension of the display and present it to the user in step 852. When the user interface manager 704 receives a maneuver command from the navigation manager in step 860, it will pass on the maneuver command to the user in step 862.

Figure 9:
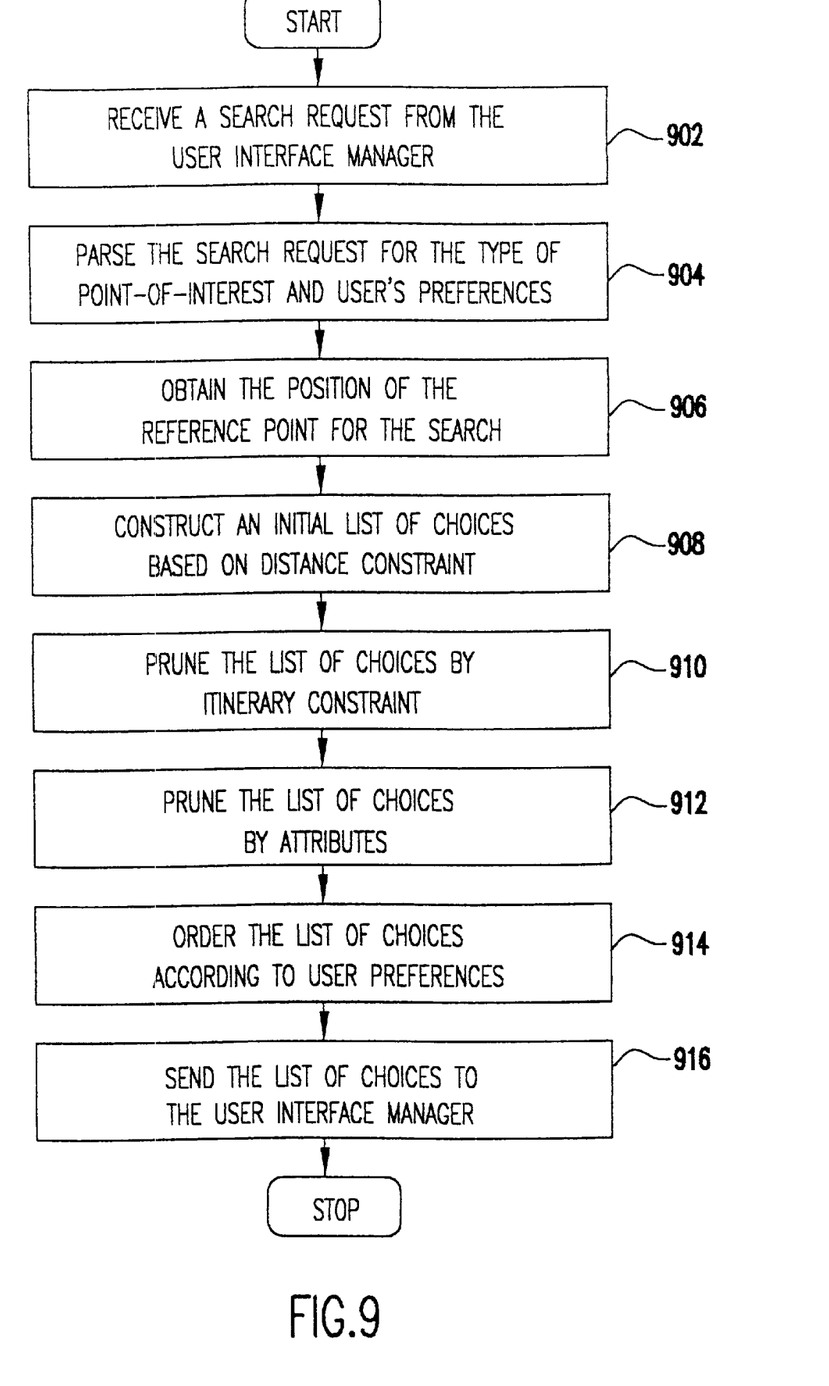
FIG. 9 is a flow diagram of the search manager implemented on the mobile navigation system.

FIG. 9 shows the flow diagram of the search manager 706. Upon receiving a search request from the user in step 902 via the user interface manager 704, the search manager 706 in step 904 parses the request and obtains the information pertaining to the search from the request itself (if this request is a custom search), or from the itinerary (if the request is based on a pre-defined search profile). The search manager 706 then obtains the position of the reference point for the search in step 906. If the reference point for the search is the current position, the search manager will obtain the position information from the location means 720. The search manager 706 then proceeds to step 908 to look up the digital map and construct an initial list of points of interest based on the distance constraint, for example, within, say, twenty miles from the current position. The search manager 706 follows in step 910 to prune this list by the itinerary constraint. For example, the user wants no more than five miles of deviation from the routes defined in his current itinerary. The search manager 706 further in step 912 prunes the list of points of interest by the required attributes such as price ranges, styles and other user preferences. Finally, the resulting list is ordered according to the user's preference in step 914 and is sent to the user interface manager in step 916.

Figure 10:
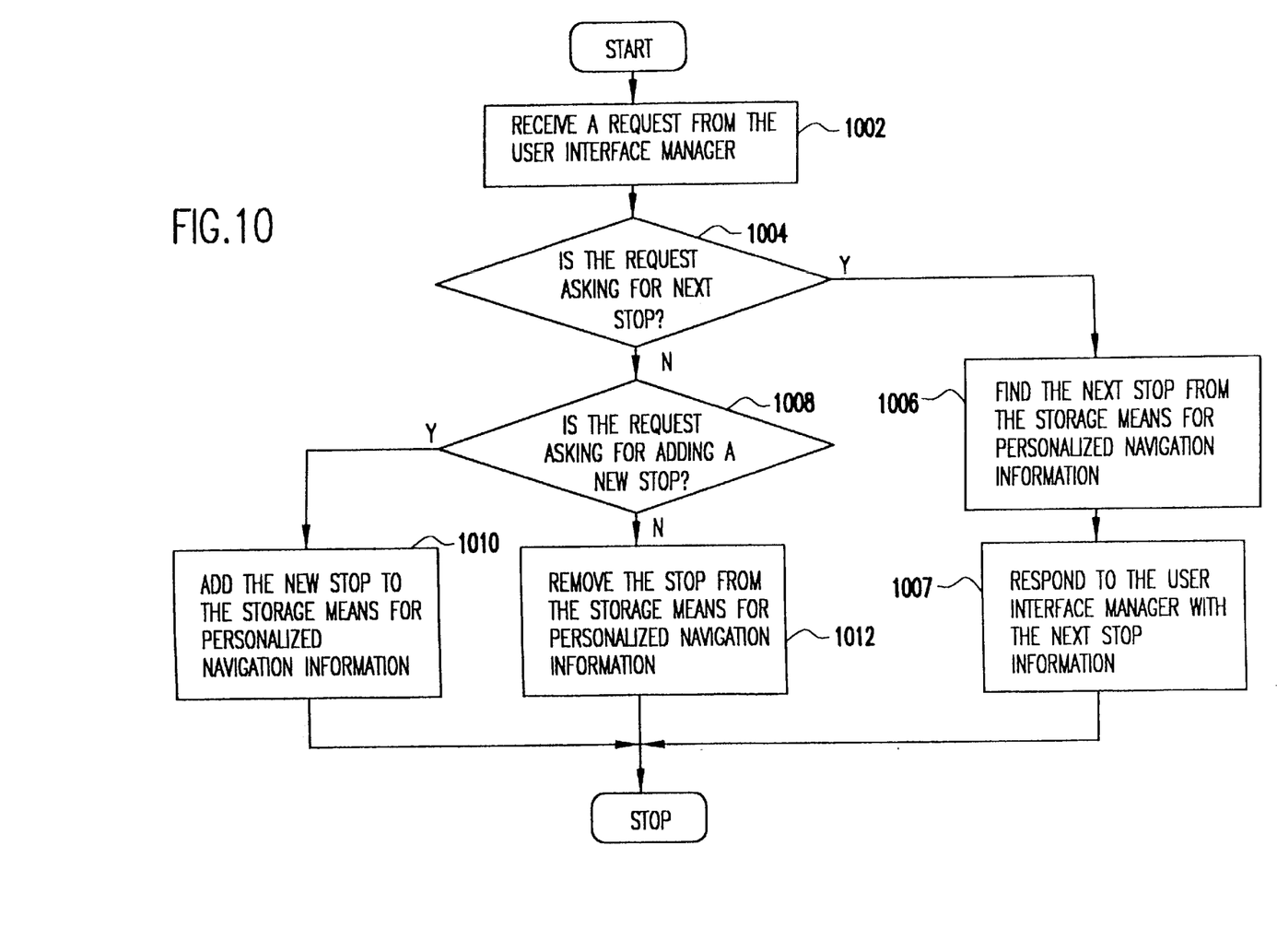
FIG. 10 is a flow diagram of the itinerary manager implemented on the mobile navigation system.

FIG. 10 shows the flow diagram for the itinerary manager 708. Upon receiving a request from the user interface manager 704 in step 1002, the itinerary manager 706 checks in step 1004 whether the request is asking for the next stop information according to the user's itinerary stored in the storage means 724. If the answer is positive, the itinerary manager 708 will find the next stop information from the personalized navigation information stored in storage means 724 in step 1006 and respond to the user interface manager 704 with the next stop information in step 1007. If the answer is negative in step 1004, the itinerary manager 708 will check whether the request is to add a new stop in step 1008. Depending on the type of request, the itinerary manager 708 will add the requested new stop to the itinerary in step 1010, or remove the requested stop from the itinerary in step 1012.

Figure 11:
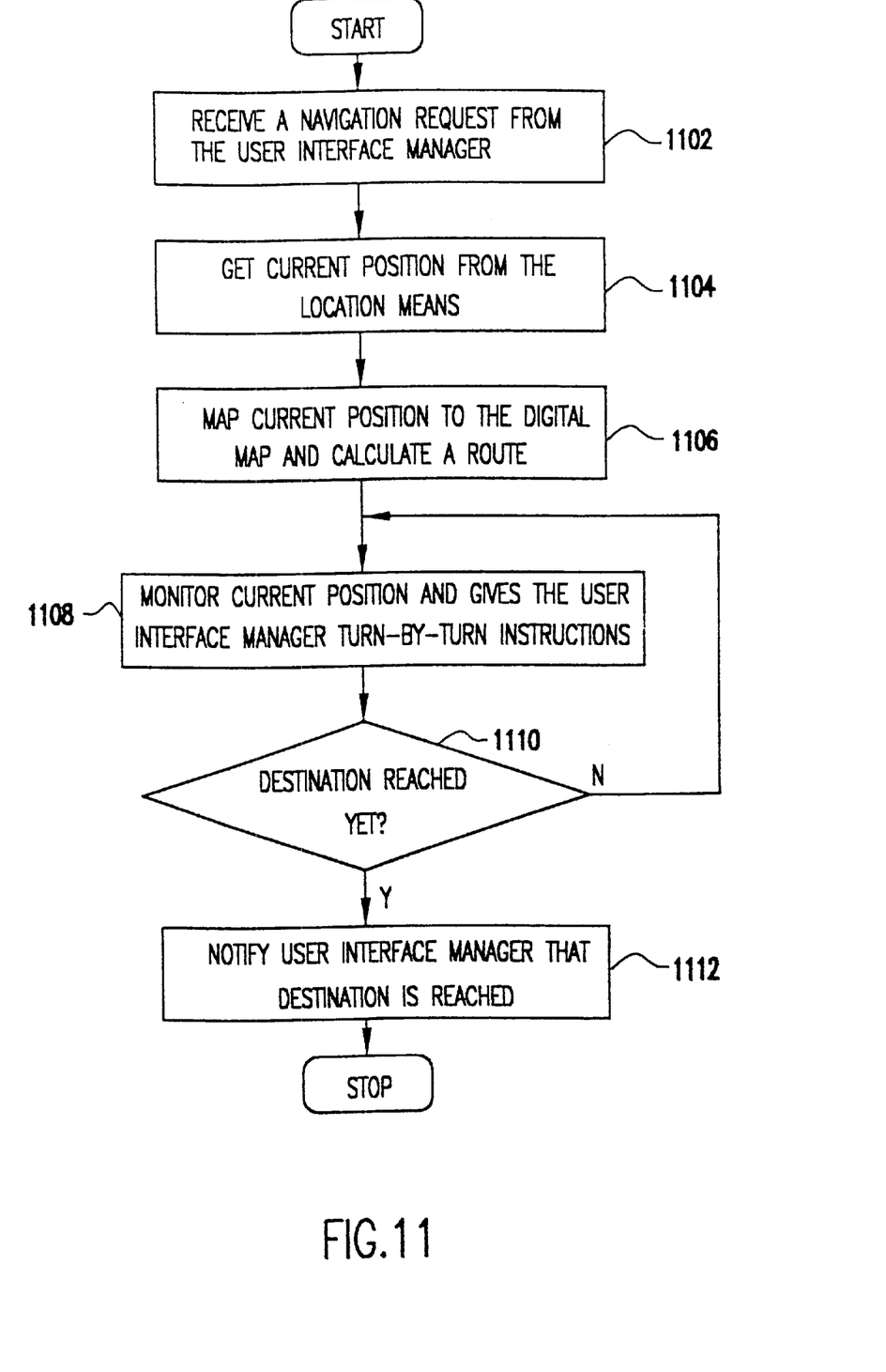
FIG. 11 is a flow diagram of the navigation manager implemented on the mobile navigation system.

FIG. 11 shows the flow diagram for the navigation manager 710. Upon receiving a navigation request from the user interface manager 704 in step 1102, the navigation manager 710 will get the current position from the location means 720 in step 1104. The navigation manager 710 proceeds to map the current position onto the digital map 722 and calculate a route in step 1106. The navigation manager 710 then keeps monitoring the current position and gives the user interface manager 704 turn-by-turn maneuver commands in step 1108 until it finds that the destination is reached in step 1110. Upon reaching the destination, the navigation manager 710 notifies the user interface manager 704 in step 1112.

While the invention has been described in terms of a single preferred embodiment, those skilled in the art will recognize that the invention can be practiced with modification within the spirit and scope of the appended claims. For example, with the itinerary information, the in-car search manager 706 can search for a point-of-interest which minimizes the deviation from the user's itinerary, instead of finding the closest one which could be on the reverse direction of driving.

Having thus described our invention, what we claim as new and desire to secure by Letters Patent is as follows:

1. A system for creating and transferring personalized navigation information to a mobile navigation system comprising:
   a mobile navigation system for providing personalized navigation services according to personalized navigation information including at least one of itinerary of locations to visit and a set of preferred routes and search preferences for points of interest;
   a computing system for creating and storing personalized navigation; and
   a memory device for transferring the personalized navigation information from the computing system to the mobile navigation system.

2. The system of claim 1, wherein the computing system is one of a standalone computer or a network connected computer.

3. The system of claim 1, wherein the memory device is one of a smart card, a personal digital assistant (PDA), PCMCIA card, or portable storage device.

4. The system of claim 1, wherein the search preferences comprise at least one of acceptable price range, traveling time or distance from a current position, and travel time or distance deviated from a current route.

5. The system of claim 1, wherein the points of interest include hotels, restaurants and service stations.

6. The system of claim 5, wherein the search preferences for hotels comprises required amenities.

7. The system of claim 5, wherein the search preferences for restaurants comprises preferred nationality or types of food served.

8. The system of claim 5, wherein the search preferences for service stations comprises required types of fuel available.

9. The system of claim 1, wherein the mobile navigation system is embedded in a vehicle.

10. The system of claim 9, wherein the mobile navigation system comprises:
    a database of points of interest;
    storage means for storing personalized navigation information;
    means for determining the position and heading of the vehicle;
    an input means for the driver to select the desired service items presented to the driver;
    an output means for presenting the available service items to the driver;
    search means for finding a point of interest in the database according to the personalized navigation information and the driver's input;
    means for setting the selected point of interest as the destination; and
    means for guiding the driver from a current position to the destination.

11. A computer implemented method for creating and transferring personalized navigation information to a mobile navigation system comprising the steps of:
    providing personalized navigation services according to personalized navigation information including at least one of itinerary of locations to visit and a set of preferred routes and search preferences for points of interest;
    creating and storing personalized navigation information; and
    transferring the personalized navigation information from the computing system to the mobile navigation system wherein the transferring is performed with a memory device.

12. The computer implemented method of claim 11, wherein the memory device is one of a smart card, a personal digital assistant (PDA), PCMCIA card, or portable storage device.

13. The computer implemented method of claim 11, wherein the search preferences comprise at least one of acceptable price range, traveling time or distance from a current position, and travel time or distance deviated from a current route.

14. The computer implemented method of claim 11, wherein the mobile navigation system is embedded in a vehicle.

15. The computer implemented method of claim 11, wherein the points of interest include hotels, restaurants and service stations.

16. The computer implemented method of claim 15, wherein the search preferences for hotels comprises required amenities.

17. The computer implemented method of claim 15, wherein the search preferences for restaurants comprises preferred nationality or types of food served.

18. The computer implemented method of claim 15, wherein the search preferences for service stations comprises required types of fuel available.

* * * * *